United States Patent
Wang et al.

(10) Patent No.: US 9,508,347 B2
(45) Date of Patent: Nov. 29, 2016

(54) METHOD AND DEVICE FOR PARALLEL PROCESSING IN MODEL TRAINING

(71) Applicant: Tencent Technology (Shenzhen) Company Limited, Shenzhen (CN)

(72) Inventors: Eryu Wang, Shenzhen (CN); Li Lu, Shenzhen (CN); Xiang Zhang, Shenzhen (CN); Haibo Liu, Shenzhen (CN); Feng Rao, Shenzhen (CN); Lou Li, Shenzhen (CN); Shuai Yue, Shenzhen (CN); Bo Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 324 days.

(21) Appl. No.: 14/108,237

(22) Filed: Dec. 16, 2013

(65) Prior Publication Data

US 2015/0019214 A1  Jan. 15, 2015

Related U.S. Application Data

(63) Continuation of application No. PCT/CN2013/085568, filed on Oct. 21, 2013.

(30) Foreign Application Priority Data

Jul. 10, 2013 (CN) .......................... 2013 1 0288097

(51) Int. Cl.
  *G10L 15/16* (2006.01)
  *G10L 15/34* (2013.01)
  (Continued)

(52) U.S. Cl.
  CPC ............... *G10L 15/34* (2013.01); *G06N 3/02* (2013.01); *G10L 15/063* (2013.01); *G10L 15/16* (2013.01)

(58) Field of Classification Search
  CPC .............................. G10L 15/16; G06N 3/02
  USPC .......................................................... 704/232
  See application file for complete search history.

(56) References Cited

U.S. PATENT DOCUMENTS 5,509,103 A * 4/1996 Wang .................. G06K 9/6287
                                                                  704/232
6,347,310 B1 * 2/2002 Passera ................ G06K 9/6273
                                                                  706/16

(Continued)

FOREIGN PATENT DOCUMENTS

CN  102737278 A  10/2012
CN  102982809 A  3/2013

(Continued)

OTHER PUBLICATIONS

H. Lee, et al., "Unsupervised Learning of Hierarchical Representations with Convolutional Deep Brief Networks," Commu. of the ACM, Oct. 2011.*

(Continued)

*Primary Examiner* — Pierre-Louis Desir
*Assistant Examiner* — Forrest F Tzeng
(74) *Attorney, Agent, or Firm* — Morgan, Lewis & Bockius LLP

(57) ABSTRACT

A method and a device for training a DNN model includes: at a device including one or more processors and memory: establishing an initial DNN model; dividing a training data corpus into a plurality of disjoint data subsets; for each of the plurality of disjoint data subsets, providing the data subset to a respective training processing unit of a plurality of training processing units operating in parallel, wherein the respective training processing unit applies a Stochastic Gradient Descent (SGD) process to update the initial DNN model to generate a respective DNN sub-model based on the data subset; and merging the respective DNN sub-models generated by the plurality of training processing units to obtain an intermediate DNN model, wherein the intermediate DNN model is established as either the initial DNN model for a next training iteration or a final DNN model in accordance with a preset convergence condition.

15 Claims, 7 Drawing Sheets

(51) Int. Cl.
*G10L 15/06* (2013.01)
*G06N 3/02* (2006.01)

(56) References Cited

U.S. PATENT DOCUMENTS

| | | | | |
|---|---|---|---|---|
| 7,254,538 | B1* | 8/2007 | Hermansky | G10L 15/144 704/232 |
| 9,240,184 | B1* | 1/2016 | Lin | G10L 15/22 |
| 2008/0208577 | A1* | 8/2008 | Jeong | G10L 15/32 704/231 |
| 2013/0282634 | A1* | 10/2013 | Deng | G06N 3/0454 706/25 |
| 2014/0067738 | A1* | 3/2014 | Kingsbury | G06N 3/08 706/20 |
| 2014/0142929 | A1* | 5/2014 | Seide | G06N 3/08 704/202 |

FOREIGN PATENT DOCUMENTS

| | | |
|---|---|---|
| CN | 103020711 A | 4/2013 |
| WO | WO 9854653 A2 | 12/1998 |

OTHER PUBLICATIONS

Tencent Technology, ISR, PCT/CN2013/085568, Apr. 23, 2014, 3 pgs.
Tencent Technology, Written Opinion, PCT/CN2013/085568, Apr. 9, 2014, 5 pgs.
Tencent Technology, IPRP, PCT/CN2013/085568, Jan. 12, 2016, 6 pgs.

* cited by examiner

METHOD AND DEVICE FOR PARALLEL PROCESSING IN MODEL TRAINING

RELATED APPLICATIONS

This application is a continuation application of PCT Patent Application No. PCT/CN2013/085568, entitled "METHOD AND DEVICE FOR PARALLEL PROCESSING IN MODEL TRAINING" filed on Oct. 21, 2013, which claims priority to Chinese Patent Application Serial No. 201310288097.6, entitled "Method and Device for Training Acoustic Models", filed on Jul. 10, 2013, both of which are incorporated herein by reference in their entirety.

FIELD OF THE INVENTION

The present disclosure relates to the technical field of speech recognition, especially relates to a method and device for training Deep Neural Network (DNN)-based acoustic and/or language models.

BACKGROUND OF THE INVENTION

Speech recognition is a kind of technology that transforms speech signals into text and facilitates human-machine interaction. Speech recognition is now widely used in the field of mobile Internet, etc. Speech recognition is a serial classification problem, aiming to transform a sequence of collected speech signals into a sequence of textual token outputs. Fields related to speech recognition technology include: signal processing, pattern recognition, probability theory, information theory, sound production mechanism, auditory mechanism, and artificial intelligence, etc.

A conventional speech recognition system is generally divided into three modules, namely, acoustic models, such as models described by the Hidden-Markov-Models-Gaussian-Mixture-Models (HMM-GMM) system framework; language models, such as models described by N-Grams; and a decoder, configured to transform the acoustical signals into text information by combining the resources of the acoustic models, the language models, and phoneme lexicon, etc. As the Deep Neural Networks (DNN) became more mature in recent years, it solved many multi-layer network training problems. At the same time, it can also utilize a large amount of unlabeled data. In the field of speech recognition, DNN also exhibits powerful modeling capabilities. DNN has shown great practical effect in both acoustic model training and language model training.

In conventional DNN model training, Stochastic Gradient Descent (SGD) algorithm can only estimate the model parameter serially. Due to the dependence relationship in time that exists between different speech data, it is difficult to implement multi-machine parallelization algorithms such as Map-Reduce. Therefore, it is not easy to speed up the DNN model training. To achieve a better speech recognition accuracy rate, a tremendous amount of training data is usually used to train DNN models in practical applications. However, when using the conventional SGD method, model training often takes thousands of hours, up to a couple of months. Such long training process has difficulty meeting the requirement of real-time use in applications.

In the research field, people firstly introduced the Quasi-Newton method to estimate DNN models. This is a kind of second-order optimization method. Firstly, the Quasi-Newton method approximately estimates the inverse matrix of a second-order Hessian matrix, then, uses this inverse matrix to update the model parameters. This is a batch training mode, and not an online training mode. In other words, all data only update the model once, and there is no time dependence relationship between data.

In theory, the second-order optimization is equivalent to the first-order parameter optimization and is faster than the traditional SGD method in respect to iterative convergence speed. However, in big data, the second-order parameter optimization mode usually needs much fine-tuning in details. In the absence of a priori knowledge, the second-order optimization is often not as robust as the first-order optimization. In detail, as for the DNN modeling of the speech recognition, this algorithm cannot achieve the usual performance of the SGD algorithm.

SUMMARY

A method and device for acoustic and/or model training is disclosed. The method and device provide improved performance in acoustic and/or language model training by enabling parallelization of the training and/or recognition processes. Given the drawbacks in conventional serial SGD-based DNN model training and second-order optimization based on the Quasi-Newton method, a robust and effective parallelization method for the model training process is highly desirable and can speed up the training many folds and making real-time applications possible.

In some embodiments, a method of training a Deep Neural Network (DNN) model (e.g., an acoustic or language model for speech recognition) includes: at a device comprising one or more processors and memory: establishing an initial DNN model; dividing a training data corpus into a plurality of disjoint data subsets; for each of the plurality of disjoint data subsets, providing the data subset to a respective training processing unit of a plurality of training processing units operating in parallel, wherein the respective training processing unit applies a Stochastic Gradient Descent (SGD) process to update the initial DNN model to generate a respective DNN sub-model based on the data subset; and merging the respective DNN sub-models generated by the plurality of training processing units to obtain an intermediate DNN model, wherein the intermediate DNN model is established as either the initial DNN model for a next training iteration or a final DNN model in accordance with a preset convergence condition.

In some embodiments, a system for training a Deep Neural Network (DNN) model (e.g., an acoustic or language model for speech recognition) includes: one or more processors and memory having instructions stored thereon, the instructions, when executed by the one or more processors, cause the processors to perform the above method.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Figure 1:
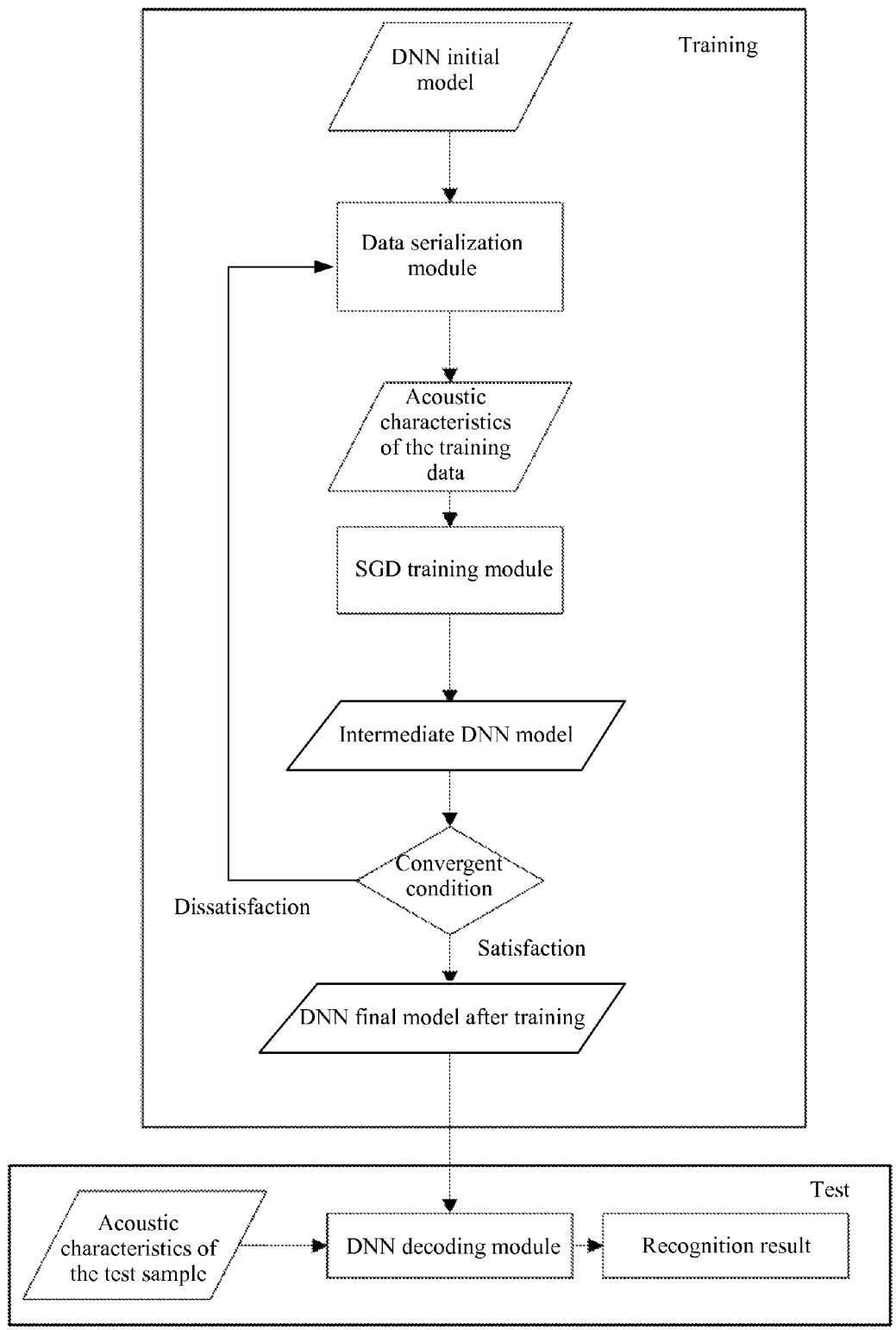
FIG. 1 illustrates processing flow of a conventional HMM-DNN system.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details.

The embodiments of the present invention focus on the training of Deep Neural Network (DNN) models, specifically, acoustic models. The training of acoustic model is a core step of speech recognition technology. The same technique described herein is also applicable to the training of language models.

Speech recognition is a serial classification problem, aiming to transform a series of collected speech signals into a series of textual token outputs. Due to the fact that speech signals are associated in time (i.e., the speech data of one moment is related to the speech data of one or more previous moments), in order to simulate the mechanism producing the speech data, Markov Model is introduced to the speech recognition field. In order to further simplify the complexity of the model, each current state of the Markov Model is related only to the state of its immediate preceding moment.

As for every specific language, since there is a finite number of the most basic pronunciation unit of speech signals, when observing a specific pronunciation, its corresponding text is not always the same. Hidden Markov Model (HMM) addresses exactly this problem. In speech recognition, HMM has been in use until now as the most basic model to describe the production system of speech data. Meanwhile, due to the fact that there is a wealth of possible variations for speech data (e.g., for the same text, there are great differences in speech for people of different genders, regions, emotions, and personalities). In order to describe these differences, Gaussian Mixture Model (GMM) is introduced to the speech recognition field. The HMM-GMM system framework has led the speech recognition field for many years. With the introduction of big data in recent years and the development of Internet technology, the HMM-GMM technique has met a large amount of practical demands.

For the HMM-GMM system, in order to train an acoustic model with a higher recognition rate, a large amount of labeled speech data is required by the Expectation-Maximization (EM) algorithm to estimate various parameters of the HMM-GMM model. For example, for the Chinese language, the lexicon of speech includes more than 100 different phonemes, however, the HMM-GMM model usually adopts a Triphone Model, then according to the phonemes in before and after context of a particular phoneme, it can be expanded into about one million different phoneme models. Consequently, a large amount of labeled speech data is needed to conduct modeling for these different phoneme models.

Due to lack of available labeled speech data, not all of the phoneme models can be covered. The corresponding labeled speech data for some certain phonemes is usually sparse. In such cases, the number of parameters that need to be estimated is greater than the amount of data available for use in the estimation. This is likely to cause the instability in the parameter estimation, and cannot carry out a good simulation of actual speech data.

In order to solve this problem, a decision tree method is proposed. In other words, according to the production mechanism of different phonemes and the amount of available estimation data, a clustering method is used to group about one million models into tens of thousands of models. In this way, each model can have more data, such that each class of models can be more accurately estimated. This clustering method is a kind of scheme that approximately estimates the models according to the available labeled speech data. Due to significant reduction in the total number of models, in each model, the original model characteristics will be obscured by the characteristics of other models in the same class or cluster. As such, the resulting model for the whole model class is just an average model whose parameters have only a moderate level of simulation power.

At the same time, the HMM models are based on a strong assumption: every state is related only to its previous state. This assumption destroys the characteristic of a time sequence signal which is correlated with the signals both before and after itself in time. In recent years, in order to offset this assumption, a splice compensation method has been introduced. The splice compensation method expands each current speech signal a few frames forward and a few frames backward to splice them into a large vector signal, then carries out the training of the HMM-GMM model using the larger vector signals. Due to the problem of high dimensionality brought by the splicing signals, it is increasingly difficult to solve the problem of data insufficiency. One solution is to carry out dimension reduction operation of this high-dimensional signal to reach the balance of data and dimensionality. Such operation frequently leads to information loss, which is not a reasonable scheme in many cases.

As the DNN technique has become more mature in recent years, it provides a solution to the problem of multi-layer network training. At the same time, DNN can also utilize a great amount of unlabeled data. In the speech recognition field, DNN also shows a powerful modeling capability. Whether in the acoustic model training or language model training, DNN has demonstrated very good practical effects. The HMM-DNN recognition framework has gradually becomes the mainstream of the current speech recognition technology.

In conventional HMM-DNN model training, a Stochastic Gradient Descent (SGD) algorithm can only estimate the model parameters serially. In other words, assuming that there are a total of one million labeled speech samples available for training, the SGD method uses the speech samples one by one to: read in the calculation gradient of the Nth speech sample; update DNN model; then, read in the (N+1)th speech sample, use the DNN model basis that is obtained in the previous iteration to calculate the gradient, and to update DNN model once again. Given the time dependence relationship that exists between the different speech samples, it is hard to implement a multi-machine parallelization scheme, such as that similar to Map-Reduce, to speed up the DNN model training process.

To achieve a better speech recognition accuracy rate, practical applications tend to require the use of a massive amount of data to train the DNN models. However, when using the conventional SGD method, the model training using thousands of hours of training data usually takes a couple of months, making it difficult to meet the real-time requirement in application. So it is increasingly valuable to implement the parallelization estimation of DNN models.

Meanwhile, because neural network is still a data-driven statistical modeling method, in cases where the training data has a certain bias, e.g., when all data are speech data from telephone conversations, the final DNN model obtained by the SGD algorithm will also contain the certain bias, e.g., it will be better at recognizing speech data received from telephone channel, but the recognition rate would be lower for speech data received from other sources. In principle, the output of DNN network is the respective posterior probability related to a certain binding phoneme state. This posterior probability has a certain probability distribution. It has a variation range, which is called deviation. This deviation leads to a worse recognition result when a DNN model trained by the telephone-style speech data is used for recognizing speech data of other-styles.

Aiming to address this problem, some embodiments of the present invention also propose a method to reduce this deviation at the side of the decoder. The solution involves the use of multiple DNN models for decoding to get the respective posterior probability output from each of the multiple DNN models, and then merging the multiple posterior probability outputs through an optimized method to get the final speech recognition output result. In this manner, the deviation of posterior probability output from each DNN model can be reduced and the performance of speech recognition can be improved.

FIG. 1 illustrates the processing flow of a conventional HMM-DNN system.

As shown in FIG. 1, under the conventional HMM-DNN system, firstly, training of a DNN acoustic model (i.e., the training stage) is performed, then, the topological structure of the trained DNN model and HMM model is used to finish a decoding operation (i.e. testing stage).

In order to train a DNN acoustic model, a training apparatus (e.g., a server computer) first obtains certain resource files, the resource files include:

(1) Acoustic characteristics of the training data: For example, the data to participate in the DNN model training (about thousands of hours) are first collected together to form a training data corpus. Then, through operation of an acoustic parameter extraction module, the acoustic characteristics of the training speech data, such as PLP, MFCC, FBank, etc., are obtained. These characteristics can reflect the textual information contained in the speech data in a better way (that is the purpose of speech recognition, namely, transforming the speech into text). The acoustic characteristics of the training speech data can be stored in respective acoustic characteristic files.

(2) State-level labels: The HMM-GMM model is used to conduct forced alignment for all training data to obtain a certain speech characteristic file, including the phoneme states corresponding to the characteristics at different time nodes. The state-level labels of the training speech data can be stored in respective state-level label files.

(3) Topological structure of the HMM model: The HMM model is trained by the conventional HMM-GMM framework, including the number of states corresponding to the final clusters, state binding list, phoneme binding list, and transition probability between states, etc. All of these are the resources required by DNN model training and testing.

(4) Topological structure of the DNN model: This includes the number of frames that the input characteristic data has been expanded forward and backward in time, the DNN network layers, the DNN network nodes, and the form of the activation function, etc.

In order to test the performance of the HMM-DNN model, another batch of resources are needed, which includes:

(5) Language model: This is the file that characterizes the interrelation between each language term that has been identified from the speech test sample. A commonly used language model is an N-gram model, which includes the occurrence probabilities of the current term under the circumstances of a given N−1 terms history.

(6) Pronunciation lexicon: This includes information on how to pronounce each term, specifically, it includes the phoneme sequence corresponding to each term.

The training process of the conventional DNN model is as follows:

Step 1: According to the topological structure of a prepared DNN model, establish an initial DNN model (i.e., the initial form of a final DNN model), and set the parameters required by the SGD process, such as the learning rate, the momentum, and the mini-batch size, etc.

Step 2: A data serialization module arrange all of the speech training data into a speech file sequence. The order of the speech training data in the speech file sequence can be random and/or dependent on the particular implementation of the data serialization module. According to the given order in the speech file sequence and the size of mini-batch, the SGD algorithm is applied to read in the acoustic characteristic files and the corresponding state-level label files in proper order, and to update the initial DNN model according to data contained in these files.

Step 3: After all of the speech training data has been used in the update of the initial DNN model, one iteration of the training process is completed. At this time, a DNN intermediate model is obtained. Cross validation of the intermediate DNN model is then carried out using a validation dataset (e.g., a development set) to determine whether this intermediate DNN model is sufficiently optimal. The cross validation specifically includes: using the speech data of the development set to calculate the recognition accuracy rate at the frame-level for the intermediate DNN model; if the accuracy rate is greater than a preset threshold (i.e., a convergence condition is satisfied), the training process can be ended, and intermediate DNN model is taken as the final DNN model to be used in speech recognition; and if the accuracy rate is less than the preset threshold (i.e., the convergence condition is not satisfied), it is indicated that this intermediate DNN model is not the optimal model, at this time, and another iteration of the training process is started by jumping back to Step 2 and using the current intermediate DNN model as the initial DNN model for continued training.

After obtaining DNN final model, the recognition or testing process can be performed on a test speech sample. When performing the recognition or testing process, the conventional HMM-DNN method needs to obtain the resources of language models, lexicon, and phoneset, etc. Dynamic or static expansion technique can be used to expand the decoding space, and the Viterbi algorithm can be used to transform the test speech sample (e.g., a test speech file) into a textual output file.

Embodiments of the present invention propose a kind of DNN model training (e.g., acoustic model training) method that utilizes a parallel DNN acoustic model training framework to replace the training process used in the conventional DNN models.

Aiming to realize a first-order optimization of the SGD method, in the DNN acoustic model training, various embodiments of the present invention propose an approximate parallelization estimation strategy, specifically, using different speech data to train multiple DNN models at the same time (i.e., in parallel), and then, apply an optimization strategy to merge these different DNN models so as to obtain a final DNN model with a better performance than that of each of the multiple DNN models.

Figure 2A:
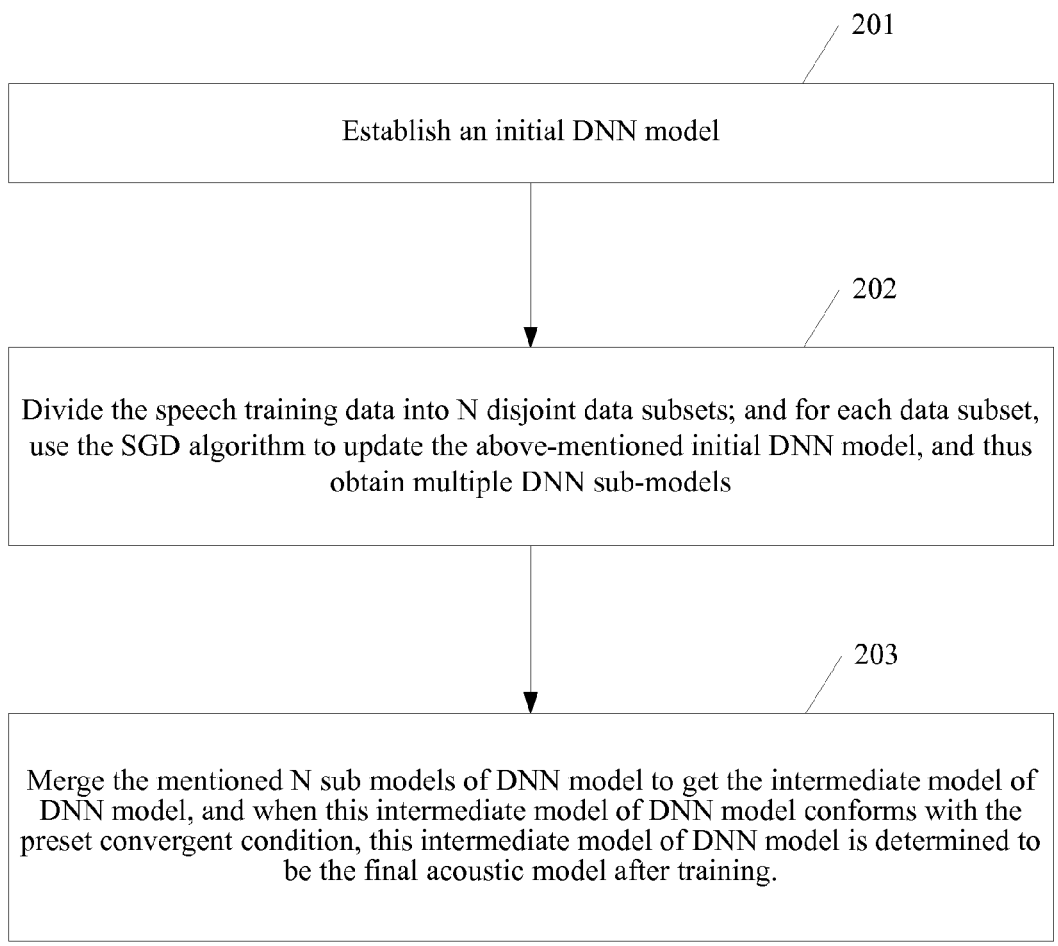
FIGS. 2A-2B are flowcharts illustrating DNN model training (e.g., DNN acoustic model training) in accordance with some embodiments.

FIG. 2A is a flowchart diagram of an acoustic model training method in accordance with some embodiments of the invention. In some embodiments, the method is performed by a single training apparatus (e.g., a single server computer implementing multiple parallel processes using a single or multiple processors). In some embodiments, the method is performed by multiple training apparatuses (e.g., multiple computers, multiple virtual computers, a mixture of multiple real and virtual computers, etc.) operating in parallel with one another.

As is shown in FIG. 2A, the method includes:

Step 201: Establish an initial DNN model (e.g., an initial form of the final DNN model).

Step 202: Divide the speech training data into N disjoint data subsets; and for each data subset, use the SGD algorithm to update the above-mentioned initial DNN model, and thus obtain multiple DNN sub-models (e.g., N sub-models, where N is a natural number of at least 2). In some embodiments, a single training apparatus performs the training of each DNN sub-model using a respective one of the N disjoint data subsets. In some embodiments, a single training apparatus divides the speech training data into the N disjoint data sets, and provide the N disjoint data subsets to multiple training apparatuses, such that each of the multiple training apparatuses uses its received data subset to update the initial DNN model, and generates a respective one of the multiple DNN sub-models. In some embodiments, each training apparatus optionally performs the training of more than one DNN sub-models, if it receives more than one data subsets. In some embodiments, when fast training time is not a primary goal, a single training apparatus optionally generates a respective DNN sub-model for each data subset one by one.

In some embodiments, during step 202, the speech training data is arranged into a speech file sequence in a random order (e.g., by a data serialization module of the training apparatus); then, the speech file sequence is divided into multiple disjoint data subsets (e.g., N data subsets, where N is a natural number of at least 2).

Step 203: The above-mentioned multiple DNN sub-models (e.g., N DNN sub-models) are merged (e.g., by a single training apparatus, such as the training apparatus that performed the division of the speech training data) to get an intermediate DNN model; and when this intermediate DNN model conforms to the preset convergence condition (e.g., having a satisfactory recognition accuracy rate during a cross validation process), this intermediate DNN model is determined to be the acoustic model after training. Otherwise, if this intermediate DNN model does not conform to the preset convergence condition (e.g., not having a satisfactory recognition accuracy rate during the cross validation process), the training is repeated for another iteration (e.g., starting from the division of the data subsets and the generation of the DNN sub-models) using the intermediate DNN model as the initial DNN model.

In some embodiments, if multiple training apparatuses are used for the generation of the multiple DNN sub-models, the training apparatus that is used to perform the division of the training data and the merging of the DNN sub-models notifies each of the multiple training apparatuses that an additional iteration of training is required, and provides a respective new data subset to each of the multiple training apparatuses for use in the next iteration of training. In some embodiments, each of the multiple training apparatuses uses its own DNN sub-model as the initial DNN model for the next iteration of training. In some embodiments, each of the multiple training apparatuses receives the merged intermediate DNN model with a respective new data subset, and performs the next iteration of training using the merged intermediate DNN model and the new data subset.

In some embodiments, in the process of merging the above-mentioned multiple (e.g., N) DNN sub-models, all layers of each DNN sub-model share the same merging weight. In some embodiments, the intermediate DNN model is a linear combination of the multiple DNN sub-models, with each DNN sub-model having a respective merging weight that is a single constant number.

In some embodiments, in the process of merging the above-mentioned multiple (e.g., N) DNN sub-models, each layer of each DNN sub-model has a respective merging weight that may be different from the merging weights of other layers of the same sub-model or the merging weights of layers of other sub-models. In some embodiments, the intermediate DNN model is a linear combination of the multiple DNN sub-models, with each DNN sub-model having a respective merging weight that is a vector of multiple constant numbers, each constant number being the respective merging weight of a respective layer of the DNN sub-model.

In some embodiments, during the testing or recognition stage of the method:

First, multiple trained acoustic models (M trained acoustic models, where M is a natural number of at least 2) are identified (e.g., by a decoding apparatus). In some embodiments, the multiple trained acoustic models are the final DNN models obtained using different training data corpora (e.g., training data collected under different acoustic conditions, and/or by people of different genders, regions, speaking styles, emotions, etc.). In some embodiments, the multiple trained acoustic models are the final DNN models obtained using different initial DNN models (e.g., DNN models having different topology structures).

In some embodiments, the multiple trained acoustic models reside on multiple processing apparatuses (e.g., the same processing apparatuses that performed the training, or processing apparatuses different from those that performed the training), and a decoding apparatus simply determines the identities of these multiple processing apparatuses and dispatches the decoding job to each of the multiple processing apparatuses. In some embodiments, a decoding apparatus (e.g., a single server computer) collects all of the multiple trained acoustic models from the different training apparatuses and performs the decoding process locally. In some embodiments, it is advantageous to allow the decoding based on the multiple trained acoustic models to run in parallel to improve the decoding speed.

In some embodiments, the same test speech data is provided as input for each of the multiple trained acoustic models, and the above-mentioned multiple acoustic models after training are used to decode the test speech data into multiple posterior probability sequences, respectively.

In some embodiments, the decoding apparatus merges the above-mentioned multiple posterior probability sequences to obtain the speech recognition result for the test speech data. In some embodiments, the decoding apparatus first obtains the multiple posterior probability sequences from the multiple processing apparatuses on which the multiple final DNN models reside. In some embodiments, the decoding apparatus performs the decoding using the multiple final DNN models residing locally, and merges the multiple posterior probability sequences obtained locally to generate the speech recognition result.

In some embodiments, the above-mentioned merging of the multiple posterior probability sequences includes: in the process of merging the above-mentioned multiple posterior probability sequences, all binding phoneme states of each posterior probability sequence share the same merging weight. In some embodiments, the merged posterior probability sequence is a linear combination of the multiple posterior probability sequences, with each probability sequence having a respective merging weight that is a single constant number.

In an embodiment, the above-mentioned merging of the above-mentioned multiple posterior probability sequences includes: in the process of merging the above-mentioned multiple posterior probability sequences, each binding phoneme states of each posterior probability sequence has a respective merging weight that may be different from the merging weights of other binding phoneme states of the posterior probability sequence or the merging weights of the binding phoneme states of other posterior probability sequences. In some embodiments, the merged posterior probability sequence is a linear combination of the multiple posterior probability sequences, with each posterior probability sequence having a respective merging weight that is a vector of multiple constant numbers, each constant number being the respective merging weight of a respective probability in the posterior probability sequence.

In some embodiments, the parallel processing described with respect to the training process need not be performed with the parallel processing described with respect to the decoding process. In some embodiments, only the training process involves parallel processing. In some embodiments, only the decoding process involves parallel processing.

Based on the aforementioned analysis, the following describes parallelization in the training of a DNN model (e.g., a DNN acoustic model) in accordance with some embodiments. In some embodiments, parallelization is also implemented in the decoding process using the trained DNN model.

Figure 2B:
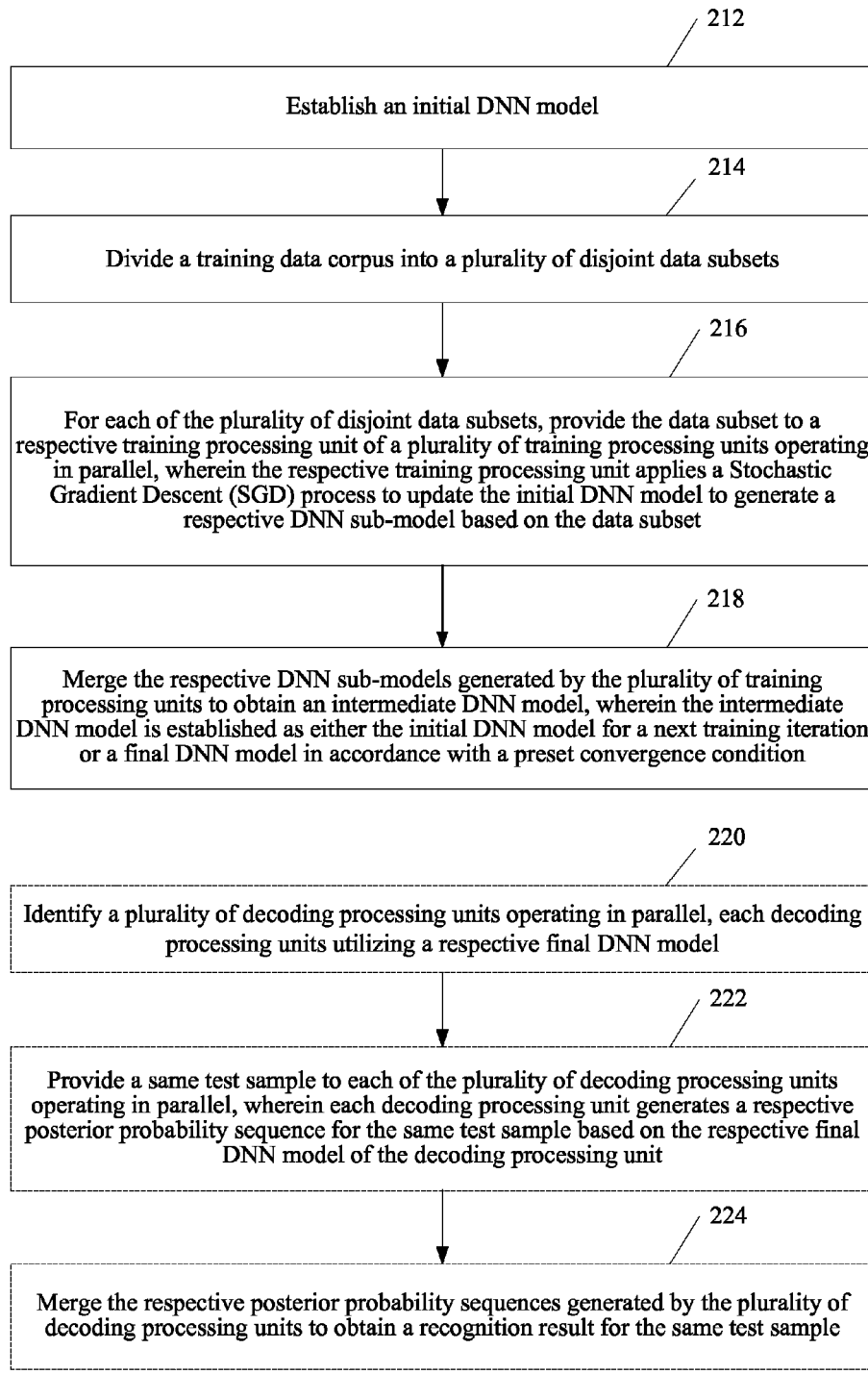

As shown in FIG. 2B, the parallelization of the training process is realized by using a single head apparatus in conjunction with a plurality of leaf apparatuses that are configured to operate in parallel with one another, where the head apparatus performs the preparation of the initial DNN model, the division of the training data set into multiple disjoint data subsets according to the number of available leaf apparatuses, the distribution of the disjoint training data subsets (and optionally, the initial DNN model) to the plurality of leaf apparatus, the receiving of the DNN sub-models from the plurality of leaf apparatuses, the merging of the received DNN sub-models, and the cross validation of the merged sub-models (i.e., the intermediate DNN model). The head apparatus is also responsible for returning the intermediate DNN model to the leaf apparatuses as an updated initial DNN model for another round of training (e.g., if the convergence condition is not satisfied), or designating the intermediate DNN model as a final DNN model (e.g., if the convergence condition is satisfied). In the process shown in FIG. 2B, the leaf apparatuses performs the updating of the initial DNN model based on the respective data subset received from the head apparatus in parallel of one another, and sends back their respective updated DNN model (i.e., their respective DNN sub-models) to the head apparatus for merging.

As shown in FIG. 2B, at Step 212, the head apparatus establishes an initial DNN model. At Step 214, the head apparatus divides a training data corpus into a plurality of disjoint data subsets (e.g., N disjoint data subsets). At Step 216, for each of the plurality of disjoint data subsets, the head apparatus provides the data subset to a respective training processing unit of a plurality of training processing units (e.g., a plurality of leaf apparatuses) operating in parallel, where the respective training processing unit applies a Stochastic Gradient Descent (SGD) process to update the initial DNN model to generate a respective DNN sub-model based on the data subset. In some embodiments, another method (e.g., a revised SGD method, a conjugate gradient descent method, a Broyden-Fletcher-Goldfarb-Shanno (BFGS) method, etc.) for updating the initial DNN model is optionally used instead of the SGD process. At Step 218, the head apparatus merges the respective DNN sub-models generated by the plurality of training processing units (e.g., the plurality of leaf apparatuses) to obtain an intermediate DNN model, where the intermediate DNN model is established as either the initial DNN model for a next training iteration or a final DNN model in accordance with a preset convergence condition.

In some embodiments, the initial and final DNN models are acoustic models for speech recognition and the training data corpus includes a plurality of randomized speech files.

In some embodiments, merging the respective DNN sub-models generated by the plurality of training processing units further includes using a respective shared merging weight for all layers of each DNN sub-model during the merging.

In some embodiments, merging the respective DNN sub-models generated by the plurality of training processing units further includes using a respective merging weight for each layer of each DNN sub-model during the merging.

In some embodiments, during the decoding process, the same head apparatus is optionally used to coordinate the parallel processing of the decoding process by a plurality of leaf apparatuses (e.g., the same or a different group of leaf apparatuses).

As shown in FIG. 2B, in some embodiments, at Step 220, the head apparatus identifies a plurality of decoding processing units operating in parallel (e.g., a plurality of leaf apparatuses), each decoding processing units utilizing a respective final DNN model (e.g., a respective final DNN model that is generated previously using different training data, different training method, and/or different initial DNN models). In some embodiments, there is no requirement that the same head apparatus performs both the training and the decoding processes described herein.

As shown in FIG. 2B, at Step 222, the head apparatus provides a same test sample to each of the plurality of decoding processing units operating in parallel (e.g., the plurality of leaf apparatuses), where each decoding processing unit (e.g., each leaf apparatus) generates a respective posterior probability sequence for the same test sample based on the respective final DNN model of the decoding processing unit. At Step 224, the head apparatus merges the respective posterior probability sequences generated by the plurality of decoding processing units to obtain a recognition result for the same test sample.

In some embodiments, merging respective posterior probability sequences generated by the plurality of decoding processing units further includes using a respective shared merging weight for all phoneme binding states of each respective posterior probability sequence during the merging of the respective posterior probability sequences generated by the plurality of decoding processing units.

In some embodiments, merging respective posterior probability sequences generated by the plurality of decoding processing units further includes using a respective merging weight for each phoneme binding state of each DNN sub-model during the merging of the respective posterior probability sequences generated by the plurality of decoding processing units.

FIG. 2B is merely illustrative of one embodiment of the present invention. Other embodiments and aspects of the invention are apparent from other parts of the description, such as the description with respect to FIG. 1, FIG. 2A and FIGS. 3-5.

Figure 3:
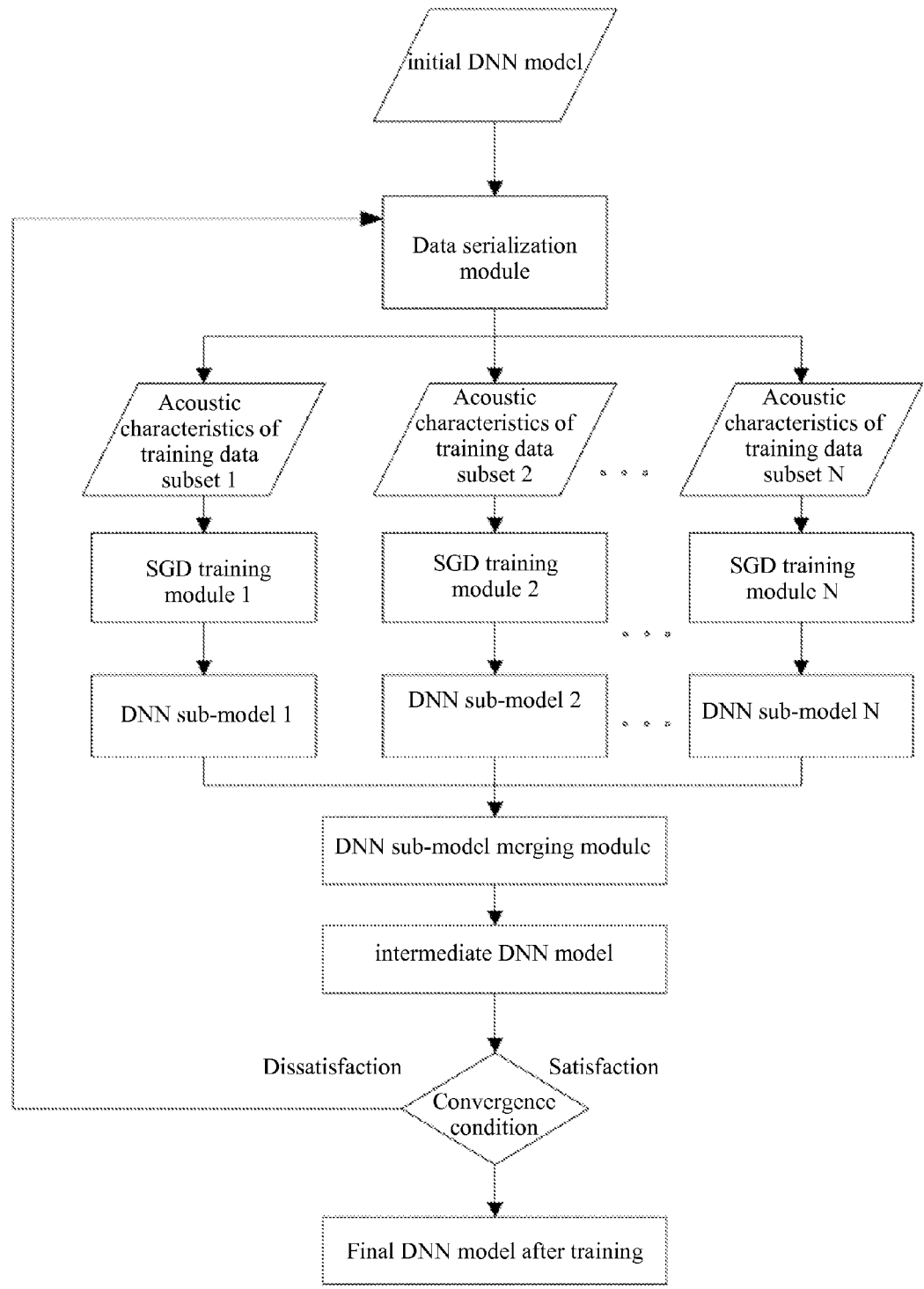
FIG. 3 illustrates processing flow of DNN model training (e.g., DNN acoustic model training) in accordance with some embodiments.

FIG. 3 illustrates a process flow of DNN acoustic model training in accordance with some embodiments.

First, certain resource files are obtained (e.g., by a training apparatus), the resource files include:

(1) Acoustic characteristics of the training data: The data (e.g., training speech samples) to participate in the DNN model training (e.g., about thousands of hours of speech data) are collected together. Through the operation of an acoustic parameter extraction module, the acoustic characteristics of training speech data, such as PLP, MFCC, FBank, etc. are obtained. These characteristics can better reflect the textual information contained in speech data. The acoustic characteristics of the training speech data can be stored in respective acoustic characteristic files.

(2) State-level labels: The HMM-GMM model is used to conduct forced alignment for all training data to obtain a certain speech characteristic file, including the phoneme states corresponding to the characteristics at different time nodes. The state-level labels of the training speech data can be stored in respective state-level label files.

(3) Topological structure of the HMM model: The HMM model is trained by the conventional HMM-GMM framework, including the number of states corresponding to the final clusters, state binding list, phoneme binding list, and transition probability between states, etc. All of these are the resources required by DNN model training and testing.

(4) Topological structure of the DNN model: This includes the number of frames that the input characteristic data has been expanded forward and backward in time, the DNN network layers, the DNN network nodes, and the form of the activation function, etc.

In order to test the performance of the HMM-DNN model, another batch of resources are needed, which includes:

(5) Language model: This is the file that characterizes the interrelation between each language term that has been identified from the speech test sample. A commonly used language model is an N-gram model, which includes the occurrence probabilities of the current term under the circumstances of a given N−1 terms history.

(6) Pronunciation lexicon: This includes information on how to pronounce each term, specifically, it includes the phoneme sequence corresponding to each term.

Moreover, the training apparatus may need to determine the number of parallel processing units available for the training process (e.g., the value of N). The number of parallel processing units is optionally based on the number of available CPU virtual and/or clusters that are configured to operate in parallel with one another.

As shown in FIG. 3, this process flow includes:

Step 1: according to the prepared topological structure of a DNN model, establish an initial DNN model, and set the initial values of the parameters required by the SGD process, such as the learning rate, the momentum, the mini-batch size, and the number of sub-models to be generated (e.g., equal to the number of data subsets to be prepared and/or the number of available parallel processing units), etc.

Step 2: arrange all of the speech training data into a speech file sequence in a random order. Then, according to the desired number (e.g., N) of DNN sub-models, divide the speech file into N disjoint data subsets. For each data subset, according to the ready order of the data samples in the data subset and the size of mini-batch, apply the SGD algorithm to read in the respective characteristic file and the corresponding status-level label file in proper order one by one, and update the initial DNN model of DNN model to obtain a respective DNN sub-model. Given that there are N available parallel processing units, the generation of the N DNN sub-models can be performed in parallel by the N available parallel processing units, where a respective SGD training module resides on each of the N available parallel processing units and generates a respective one of the N DNN sub-models using a respective one of the N data subsets.

Step 3: Use a development data set for the merging of the DNN sub-models, call the DNN sub-model merging module to merge the N DNN sub-models through an optimization method to obtain the intermediate DNN model.

In some embodiments, assuming that each DNN sub-model contains H layers, and that the parameters contained in each layer is written as $W_{nh}$, where n indicates the nth sub-model of the N sub-models, and h indicates the hth layer of the H layers, and where n is an integer in the interval [1, N], h is an integer in the interval [1, H].

In some embodiments, the merging process optionally implements two merging strategies.

One strategy is a model-level merging, that is, all layers of each sub-model share a common merging weight. $W_{final,x} = a_1 W_{1x} + a_2 * W_{2x} + \ldots + a_N * W_{Nx}$, where $W_{final,x}$ indicates the weight of the xth layer after the final merging (i.e., the weight of the xth layer in the final DNN model), where x is an integer in the interval [1, H] and the weights meet the condition of $a_1 + a_2 + \ldots + a_N = 1$. $W_{nx}$ indicates the respective weight of the xth layer for the nth sub-model, and $a_n$ indicates the respective merging weight shared by all layers of the nth sub-model, where n is an integer in the interval [1, N].

Another strategy is the layer-level merging, where the parameters of each layer of each sub-model has a respective weight (e.g., different weights from one another). $W_{final,x} = a_{1x} * W_{1x} + a_{2x} * W_{2x} + \ldots + a_{Nx} * W_{Nx}$, where x indicates the xth layer, x being an integer in the interval [1, H] and the weights meeting the condition of $a_{1x} + a_{2x} + \ldots + a_{Nx} = 1$. $W_{nx}$ indicates the respective weight of the xth layer for the nth sub-model, and $a_{nx}$ indicates the respective merging weight for the xth layer of the nth sub-model, where n is an integer in the interval [1, N].

As a person skilled in the art would appreciate, it is possible to adopt various optimization means to realize the estimation of the merging weight(s). For example, in some embodiments, the first-order gradient descent algorithm and/or the second-order LBFGS algorithm can be used to estimate the merging weights.

Step 4: the DNN model after the aforementioned merging is an intermediate DNN model. The development data set can be used again to carry out cross validation to determine whether this intermediate DNN model is sufficiently optimal. In some embodiments, the cross validation process specifically includes: using the speech data of development data set to calculate the recognition accuracy rate at the frame-level using the intermediate DNN model. If the accuracy rate in the development data set is greater than a preset threshold value, the training can be ended, and the intermediate DNN model is designated as a final DNN model; and if the accuracy rate is less than the preset threshold value, it indicates that this intermediate DNN model is not sufficiently optimized, and at least one additional iteration of training is required at this time. To perform the additional iteration of training, the process returns to Step 2 and the training begins again with the intermediate DNN model as the updated initial DNN model, and a new data subset produced by the data serialization module based on a newly generated speech sequence file (e.g., with a different randomized order from before). The iterative process continues until the intermediate DNN model obtained in a current iteration satisfies the convergence condition, and is designated as the final DNN model.

After obtaining the final DNN model according to the aforementioned process flow, a decoding process can be performed using the test method shown in the process flow of the conventional HMM-DNN model framework, in accordance with some embodiments.

However, in some embodiments, preferably, the present disclosure also proposes training multiple DNN acoustic models, where each DNN model has the same number of the output states, and all of these states are from the same HMM-GMM model. Besides this above requirement, the topological structure of each DNN model (e.g., the number of layers in the DNN, the number of nodes within each hidden layer, etc.) may be different; the training methods (for example, adopting a mix of conventional DNN training methods and the parallel training methods proposed by the present disclosure) used to obtain the multiple DNN acoustic models may be different; the training parameter (e.g., the learning rate, the momentum, the mini-batch size) settings may be different; and/or the adopted speech training data sets may be different, in the generation of the different trained DNN acoustic models.

Figure 4:
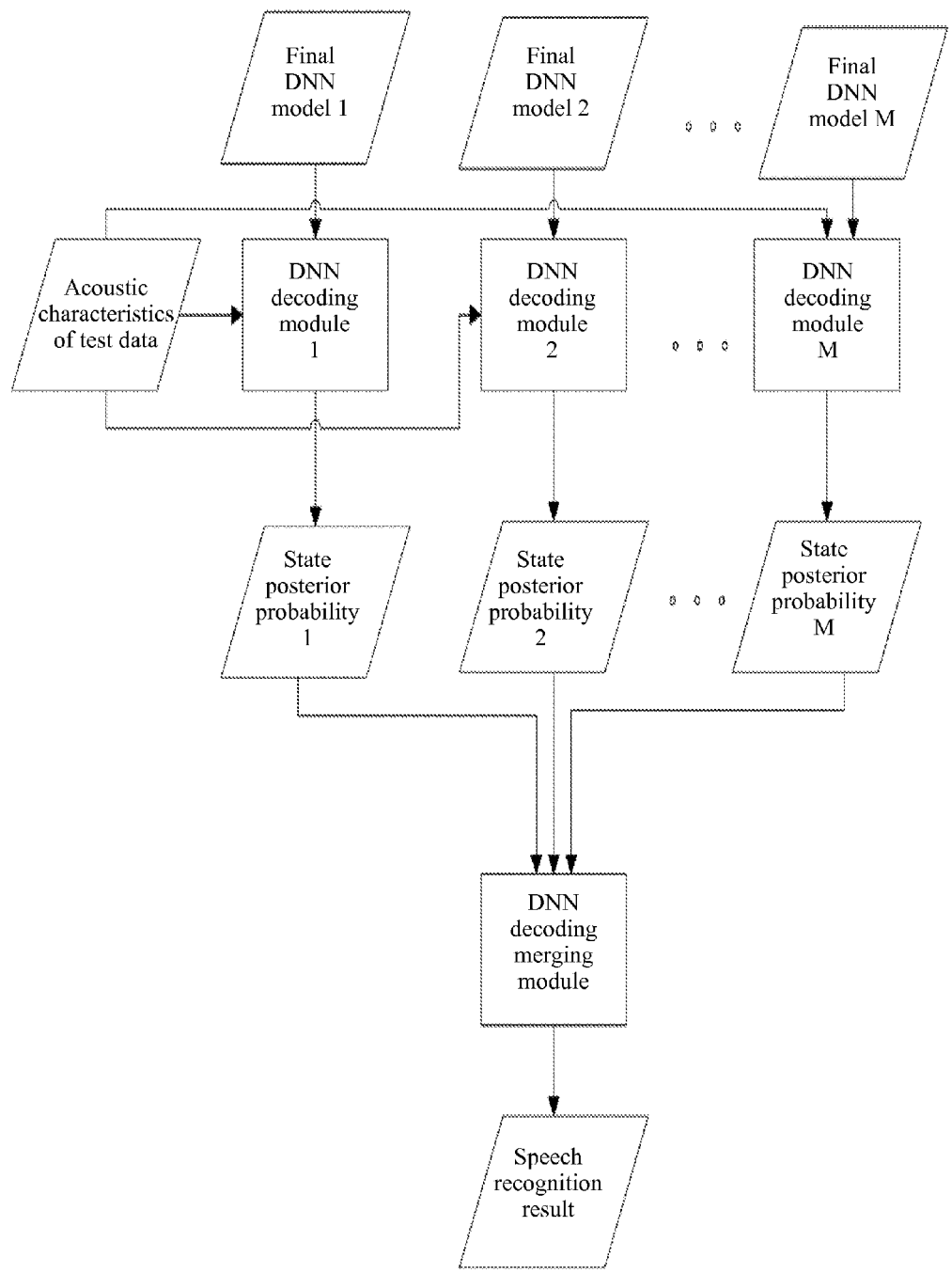
FIG. 4 illustrates processing flow for recognizing a test sample using multiple DNN final models (e.g., DNN final acoustic models) in accordance with some embodiments.

FIG. 4 is a process flow of a decoding process (e.g., testing or recognition) of a test sample (e.g., a test speech sample) using multiple trained DNN acoustic models in accordance with some embodiments. This decoding process is optionally performed by a single head processing unit controlling multiple parallel processing units (e.g., multiple CUP clusters). For example, in some embodiments, the head processing unit performs the identification of the multiple final DNN models controlled by the multiple parallel processing units, and sending the test sample to each of the multiple parallel processing units. Each of the multiple parallel processing unit performs the decoding of the test sample using its respective final DNN model, generates a respective state posterior probability sequence, and returns the respective state posterior probability sequence to the head processing unit. The head processing unit performs the merging of the received state posterior probability sequence and generates a recognition result for the test sample based on the result of the merging.

As is shown in FIG. 4, the process flow includes:

Step 1: Collect M different DNN acoustic models and collect all required resource files in a manner similar to that described with respect to the conventional HMM-DNN decoding process.

Step 2: For the same test speech data, respectively use each of the M DNN acoustic models to decode the test speech data to obtain M posterior probability sequences.

Step 3: Use the development data set to merge the M posterior probability sequences obtained in Step 2 so as to obtain the final speech recognition result.

Based on the aforementioned specific analysis, the embodiment of the present invention also puts forward a kind of acoustic model training device.

Figure 5:
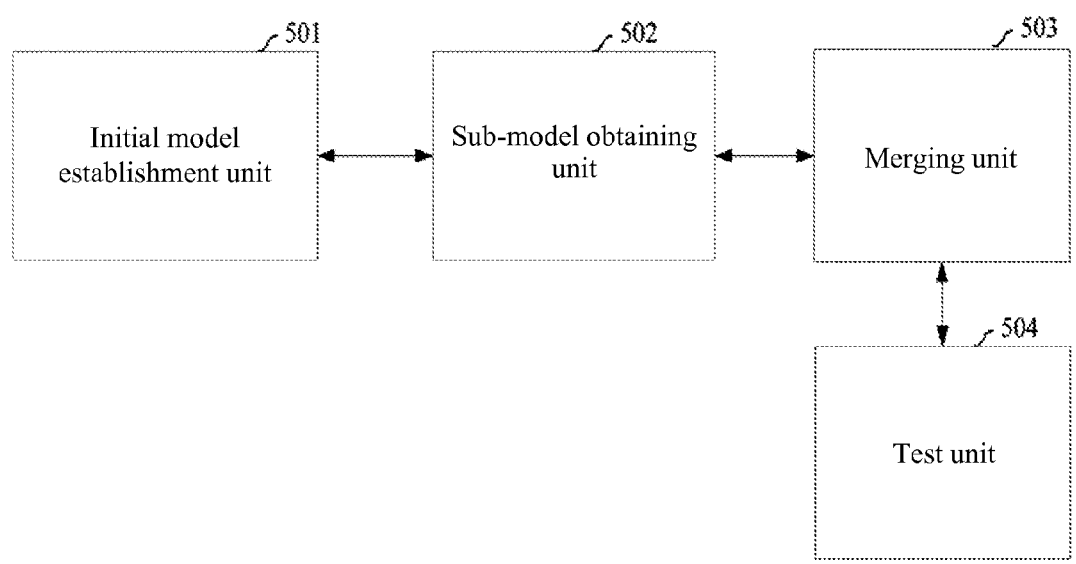
FIG. 5 is a block diagram of a DNN model training apparatus in accordance with some embodiments.

FIG. 5 is a structural diagram of acoustic model training device in accordance with some embodiments.

As shown in FIG. 5, the acoustic model training device includes initial model establishment unit 501, sub-model obtaining unit 502, and merging unit 503, among which:

Initial model establishment unit 501 is configured to establish the initial DNN model;

Sub model obtaining unit 502 is configured to divide the speech training data into N disjoint data subsets, for each data subset, use an SGD algorithm to update the above-mentioned initial DNN model, and thus obtain N DNN sub-models; and Merging unit 503 is configured to merge the above-mentioned N DNN sub-models to obtain an intermediate DNN model, where when this intermediate DNN model satisfies a preset convergence condition, this intermediate DNN model is determined to be the final DNN model (e.g., a trained acoustic model).

In some embodiments, Sub-model obtaining unit 502 is configured to arrange the speech training data into a speech file sequence in a random order; and divide this speech file sequence into N disjoint data subsets.

In some embodiments, Merging unit 503 is configured to, in the process of merging the above-mentioned N DNN sub-models, use a respective shared merge weight for all layers of each DNN sub-model.

In some embodiments, Merging unit 503 is configured to, in the process of merging the above-mentioned N DNN sub-models, use a respective merging weight for each layer of each DNN sub-model.

In some embodiments, the device further optionally includes test unit 504, where:

Test unit 504 is configured to collect M trained acoustic models, where M is the natural number of at least 2; for the same test speech data, Test unit 504 respectively uses the above-mentioned M trained acoustic models to decode the test speech data and obtain M posterior probability sequences; and merge the above-mentioned M posterior probability sequences to obtain a speech recognition result for the test speech data.

In some embodiments, Test unit 504 is configured to, in the process of merging the above-mentioned M posterior probability sequences, use a shared merging weight for all of the binding phoneme states of each posterior probability sequence.

In some embodiments, Test unit 504 is configured to, in the process of merging the above-mentioned M posterior probability sequences, use a respective merging weight for each binding phoneme state of each posterior probability sequence.

Other details and aspects of the device shown in FIG. 5 can be understood according to the descriptions of FIG. 1, FIGS. 2A-2B, and FIGS. 3-4.

In some embodiments, it is acceptable to integrate the methods shown in FIGS. 2A-2B and 3-4 into speech recognition hardware entities. For instance, it is acceptable to integrate the methods into: devices including feature phones, smart phones, portable computers, personal computers (PCs), tablet computers, and/or personal digital assistants (PDAs), etc.

In fact, there are various forms to implement specifically the acoustic model training methods embodied in the embodiments described above. For example, through application program interface following certain specifications, the acoustic model training method can be written as a plug-in application installed in a natural language processing server, and/or packaged as an application used for downloading by users themselves as well. When written as a plug-in, it is allowed to be implemented in various plug-in forms including ocx, dll, cab, etc. It is also acceptable to implement the acoustic model training method mentioned above through specific technologies including Flash plug-in, RealPlayer plug-in, MMS plug-in, MI stave plug-in, ActiveX plug-in, etc.

Through storage methods of instruction or instruction set, the acoustic model training methods described above can be stored in various non-transitory storage media. These storage media include but not limited to: floppy disks, CDs, DVDs, hard disks, Nand flash disks, USB flash disks, CF cards, SD cards, MMC cards, SM cards, Memory Sticks, and xD cards, etc. In addition, the acoustic model training methods described above can also be stored on storage medium based on Nand flash, such as USB flash disks, CF cards, SD cards, SDHC cards, MMC cards, SM cards, Memory Sticks, xD cards, and so on.

Figure 6:
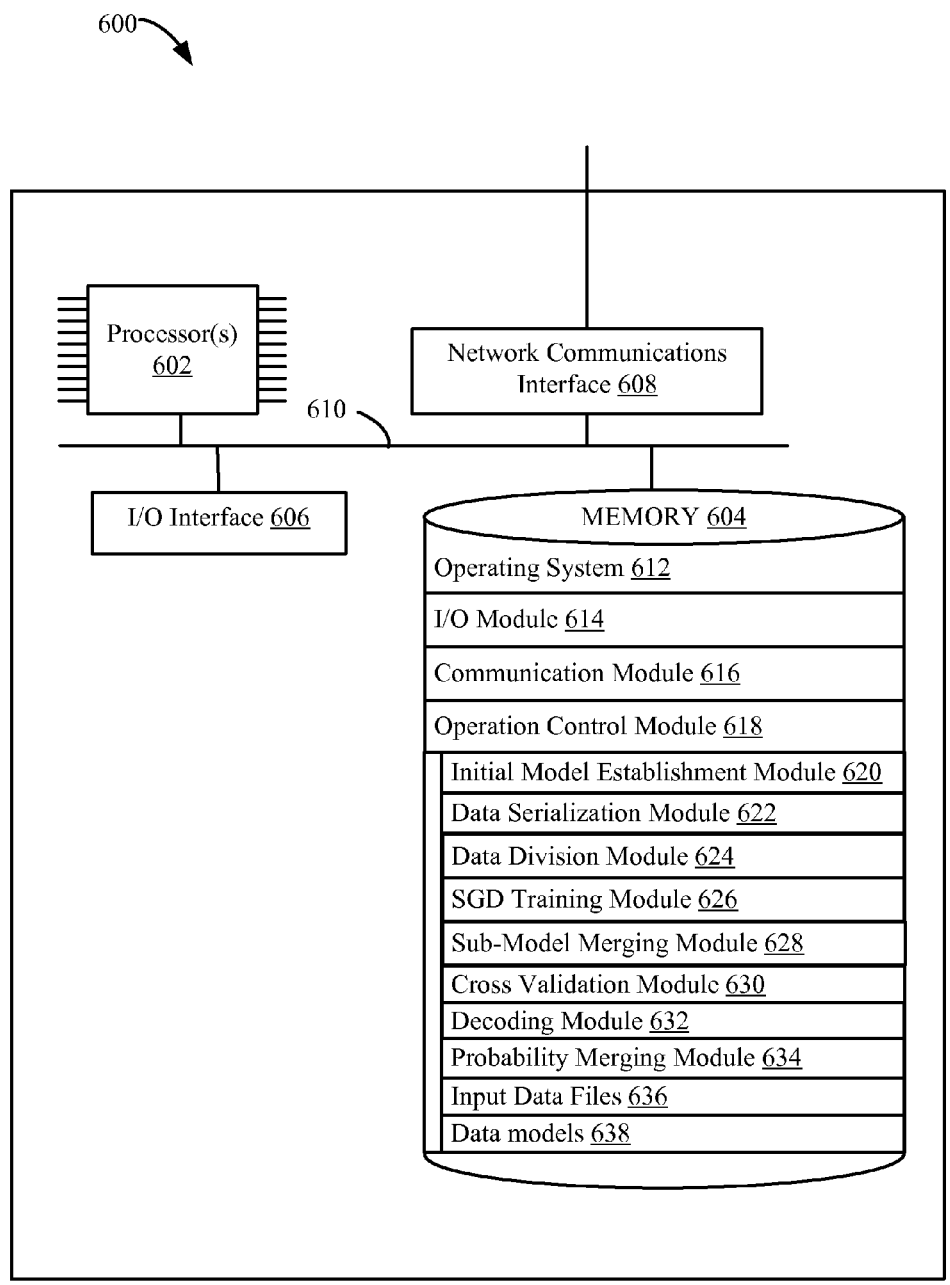
FIG. 6 is a block diagram of a system for DNN model training and test sample recognition in accordance with some embodiments.

FIG. 6 is a block diagram of a system 600 that implements the present disclosure in accordance with some embodiments. In some embodiments, the system 600 is one of multiple processing apparatuses participating in the training and/or decoding processes described above. In some embodiments, the system 600 represents a single machine having multiple parallel processing units for performing the training and/or decoding processes described above.

As shown in FIG. 6, the system 600 includes one or more processing units (or "processors") 602, memory 604, an input/output (I/O) interface 606, and a network communications interface 608. These components communicate with one another over one or more communication buses or signal lines 610. In some embodiments, the memory 604, or the computer readable storage media of memory 604, stores programs, modules, instructions, and data structures including all or a subset of: an operating system 612, an I/O module 614, a communication module 616, and an operation control module 618. The one or more processors 602 are coupled to the memory 604 and operable to execute these programs, modules, and instructions, and reads/writes from/to the data structures.

In some embodiments, the processing units 602 include one or more microprocessors, such as a single core or multi-core microprocessor. In some embodiments, the processing units 602 include one or more general purpose processors. In some embodiments, the processing units 602 include one or more special purpose processors. In some embodiments, the processing units 602 include one or more personal computers, mobile devices, handheld computers, tablet computers, or one of a wide variety of hardware platforms that contain one or more processing units and run on various operating systems.

In some embodiments, the memory 604 includes high-speed random access memory, such as DRAM, SRAM, DDR RAM or other random access solid state memory devices. In some embodiments the memory 604 includes non-volatile memory, such as one or more magnetic disk storage devices, optical disk storage devices, flash memory devices, or other non-volatile solid state storage devices. In some embodiments, the memory 604 includes one or more storage devices remotely located from the processing units 602. The memory 604, or alternately the non-volatile memory device(s) within the memory 604, comprises a computer readable storage medium.

In some embodiments, the I/O interface 606 couples input/output devices, such as displays, a keyboards, touch screens, speakers, and microphones, to the I/O module 614 of the system 600. The I/O interface 606, in conjunction with the I/O module 614, receive user inputs (e.g., voice input, keyboard inputs, touch inputs, etc.) and process them accordingly. The I/O interface 606 and the user interface module 614 also present outputs (e.g., sounds, images, text, etc.) to the user according to various program instructions implemented on the system 600.

In some embodiments, the network communications interface 608 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 608 enables communication between the system 600 with networks, such as the Internet, an intranet and/or a wireless network, such as a cellular telephone network, a wireless local area network (LAN) and/or a metropolitan area network (MAN), and other devices. The communications module 616 facilitates communications between the system 600 and other devices (e.g., other devices participating in the parallel training and/or decoding processes) over the network communications interface 608.

In some embodiments, the operating system 602 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

In some embodiments, the system 600 is implemented on a standalone computer system. In some embodiments, the system 600 is distributed across multiple computers. In some embodiments, some of the modules and functions of the system 600 are divided into a server portion and a client portion, where the client portion resides on a leaf device and communicates with the server portion residing one a head device through one or more networks. It should be noted that the system 600 is only one example of the operation server system, and that the system 600 may have more or fewer components than shown, may combine two or more components, or may have a different configuration or arrangement of the components. The various components shown in FIG. 6 may be implemented in hardware, software, firmware, including one or more signal processing and/or application specific integrated circuits, or a combination of thereof.

As shown in FIG. 6, the system 600 stores the operation control module 618 in the memory 604. In some embodiments, the operation control module 618 further includes the followings sub-modules, or a subset or superset thereof: an initial model establishment module 620, a data serialization module 622, a data division module 624, one or more SGD training modules 626, a sub-model merging module 628, a cross validation module 630, one or more decoding modules 632, a probability merging module 634. In addition, each of these modules has access to one or more of the following data structures and data sources of the operation control module 618, or a subset or superset thereof: input data files 636 including training data characteristics files, state-level label files, HMM model topologies, DNN model topologies, information on available parallel processing resources, convergence conditions, SGD parameters, test samples, etc.; and data models 638 including one or more initial DNN models, one or more DNN sub-models, one or more intermediate DNN models, and one or more final DNN models. In some embodiments, the operation control module 618 optionally includes one or more other modules to provide other related functionalities described herein. More details on the structures, functions, and interactions of the sub-modules and data structures of the operation control module 618 are provided with respect to FIGS. 2A-5, and accompanying descriptions.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of training a Deep Neural Network (DNN) model, comprising:
at a head computing device comprising one or more processors and memory:
establishing an initial DNN model;
dividing a training data corpus into a plurality of disjoint data subsets;
for each of the plurality of disjoint data subsets, providing the data subset to a respective training processing unit of a plurality of training processing units operating in parallel, wherein a training processing unit is provided by a respective leaf computing device of a plurality of leaf computing devices operating in parallel, the plurality of leaf computing devices being coupled to the head computing device, and wherein the respective training processing unit applies a Stochastic Gradient Descent (SGD) process to update the initial DNN model to generate a respective DNN sub-model of a plurality of DNN sub-models based on the data subset; and
merging the respective DNN sub-models generated by the plurality of training processing units to obtain an intermediate DNN model, wherein the intermediate DNN model is established as either a respective initial DNN model for a next training iteration or a final DNN model in accordance with a preset convergence condition, and wherein merging the respective DNN sub-models comprises:
for each DNN sub-model of the plurality of DNN sub-models, assigning a respective first merging weight to each layer of a plurality of layers of each DNN sub-model; and
for the plurality of DNN sub-models, applying a linear combination of the respective DNN sub-models to obtain the intermediate DNN model, wherein applying the linear combination comprises:
assigning a respective second merging weight to each DNN sub-model of the plurality of DNN sub-models, wherein the respective second merging weight of each DNN sub-model is a vector of the respective first merging weights of all layers of the respective DNN sub-model,
wherein the initial and final DNN models are acoustic models of speech recognition and the training data corpus comprises a plurality of randomized speech files.

2. The method of claim 1, wherein merging the respective DNN sub-models generated by the plurality of training processing units further comprises:
using a respective shared first merging weight for all layers of each DNN sub-model during the merging.

3. This method of claim 1, further comprising:
identifying a plurality of decoding processing units operating in parallel, each decoding processing units utilizing a respective final DNN model;
providing a same test sample to each of the plurality of decoding processing units operating in parallel, wherein each decoding processing unit generates a respective posterior probability sequence for the same test sample based on the respective final DNN model of the decoding processing unit; and
merging the respective posterior probability sequences generated by the plurality of decoding processing units to obtain a recognition result for the same test sample.

4. The method of claim 3, wherein merging respective posterior probability sequences generated by the plurality of decoding processing units further comprises:
using a respective shared merging weight for all phoneme binding states of each respective posterior probability sequence during the merging of the respective posterior probability sequences generated by the plurality of decoding processing units.

5. The method of claim 3, wherein merging respective posterior probability sequences generated by the plurality of decoding processing units further comprises:
using a respective merging weight for each phoneme binding state of each DNN sub-model during the merging of the respective posterior probability sequences generated by the plurality of decoding processing units.

6. A system for training a Deep Neural Network (DNN) model, comprising:
a head computing device; and
a plurality of leaf computing devices operating in parallel and coupled to the head computing device, wherein head computing device comprises:
one or more processors; and
memory having instructions stored thereon, the instructions, when executed by the one or more processors, cause the processors to perform operations comprising:

establishing an initial DNN model;
dividing a training data corpus into a plurality of disjoint data subsets;
for each of the plurality of disjoint data subsets, providing the data subset to a respective training processing unit of a plurality of training processing units operating in parallel, wherein a training processing unit is provided by a respective leaf computing device of the plurality of leaf computing devices operating in parallel, and wherein the respective training processing unit applies a Stochastic Gradient Descent (SGD) process to update the initial DNN model to generate a respective DNN sub-model of a plurality of DNN sub-models based on the data subset; and
merging the respective DNN sub-models generated by the plurality of training processing units to obtain an intermediate DNN model, wherein the intermediate DNN model is established as either a respective initial DNN model for a next training iteration or a final DNN model in accordance with a preset convergence condition, and wherein merging the respective DNN sub-models comprises:
for each DNN sub-model of the plurality of DNN sub-models, assigning a respective first merging weight to each layer of a plurality of layers of each DNN sub-model; and
for the plurality of DNN sub-models, applying a linear combination of the respective DNN sub-models to obtain the intermediate DNN model, wherein applying the linear combination comprises:
assigning a respective second merging weight to each DNN sub-model of the plurality of DNN sub-models, wherein the respective second merging weight of each DNN sub-model is a vector of the respective first merging weights of all layers of the respective DNN sub-model,
wherein the initial and final DNN models are acoustic models of speech recognition and the training data corpus comprises a plurality of randomized speech files.

7. The system of claim 6, wherein merging the respective DNN sub-models generated by the plurality of training processing units further comprises:
using a respective shared first merging weight for all layers of each DNN sub-model during the merging.

8. The system of claim 6, wherein the operations further comprise:
identifying a plurality of decoding processing units operating in parallel, each decoding processing units utilizing a respective final DNN model;
providing a same test sample to each of the plurality of decoding processing units operating in parallel, wherein each decoding processing unit generates a respective posterior probability sequence for the same test sample based on the respective final DNN model of the decoding processing unit; and
merging the respective posterior probability sequences generated by the plurality of decoding processing units to obtain a recognition result for the same test sample.

9. The system of claim 8, wherein merging respective posterior probability sequences generated by the plurality of decoding processing units further comprises:
using a respective shared merging weight for all phoneme binding states of each respective posterior probability sequence during the merging of the respective posterior probability sequences generated by the plurality of decoding processing units.

10. The system of claim 8, wherein merging respective posterior probability sequences generated by the plurality of decoding processing units further comprises:
using a respective merging weight for each phoneme binding state of each DNN sub-model during the merging of the respective posterior probability sequences generated by the plurality of decoding processing units.

11. A non-transitory computer-readable storage medium having instructions stored thereon, the instructions, when executed by one or more processors, cause the processors to perform operations comprising:
at a head computing device:
establishing an initial DNN model;
dividing a training data corpus into a plurality of disjoint data subsets;
for each of the plurality of disjoint data subsets, providing the data subset to a respective training processing unit of a plurality of training processing units operating in parallel, wherein a training processing unit is provided by a respective leaf computing device of a plurality of leaf computing devices operating in parallel, the plurality of leaf computing devices being coupled to the head computing device, and wherein the respective training processing unit applies a Stochastic Gradient Descent (SGD) process to update the initial DNN model to generate a respective DNN sub-model of a plurality of DNN sub-models based on the data subset; and
merging the respective DNN sub-models generated by the plurality of training processing units to obtain an intermediate DNN model, wherein the intermediate DNN model is established as either a respective initial DNN model for a next training iteration or a final DNN model in accordance with a preset convergence condition, and wherein merging the respective DNN sub-models comprises:
for each DNN sub-model of the plurality of DNN sub-models, assigning a respective first merging weight to each layer of a plurality of layers of each DNN sub-model; and
for the plurality of DNN sub-models, applying a linear combination of the respective DNN sub-models to obtain the intermediate DNN model, wherein applying the linear combination comprises:
assigning a respective second merging weight to each DNN sub-model of the plurality of DNN sub-models, wherein the respective second merging weight of each DNN sub-model is a vector of the respective first merging weights of all layers of the respective DNN sub-model,
wherein the initial and final DNN models are acoustic models of speech recognition and the training data corpus comprises a plurality of randomized speech files.

12. The computer-readable storage medium of claim 11, wherein merging the respective DNN sub-models generated by the plurality of training processing units further comprises:
using a respective shared first merging weight for all layers of each DNN sub-model during the merging.

13. The computer-readable storage medium of claim 11, wherein the operations further comprise:

identifying a plurality of decoding processing units operating in parallel, each decoding processing units utilizing a respective final DNN model;

providing a same test sample to each of the plurality of decoding processing units operating in parallel, wherein each decoding processing unit generates a respective posterior probability sequence for the same test sample based on the respective final DNN model of the decoding processing unit; and merging the respective posterior probability sequences generated by the plurality of decoding processing units to obtain a recognition result for the same test sample.

14. The computer-readable storage medium of claim 13, wherein merging respective posterior probability sequences generated by the plurality of decoding processing units further comprises:

using a respective shared merging weight for all phoneme binding states of each respective posterior probability sequence during the merging of the respective posterior probability sequences generated by the plurality of decoding processing units.

15. The computer-readable storage medium of claim 13, wherein merging respective posterior probability sequences generated by the plurality of decoding processing units further comprises:

using a respective merging weight for each phoneme binding state of each DNN sub-model during the merging of the respective posterior probability sequences generated by the plurality of decoding processing units.

* * * * *